No. 817,982. PATENTED APR. 17, 1906.
J. I. & T. E. NICHOLSON.
SLEIGH RUNNER ATTACHMENT FOR VEHICLES.
APPLICATION FILED JULY 8, 1905.
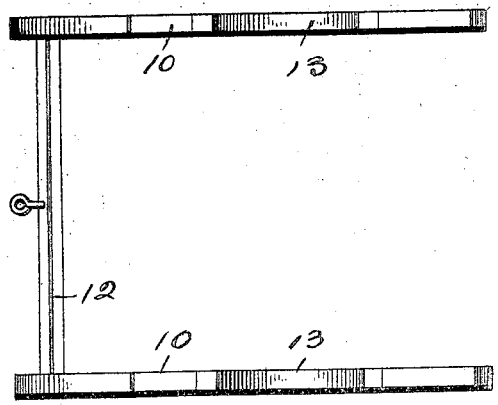
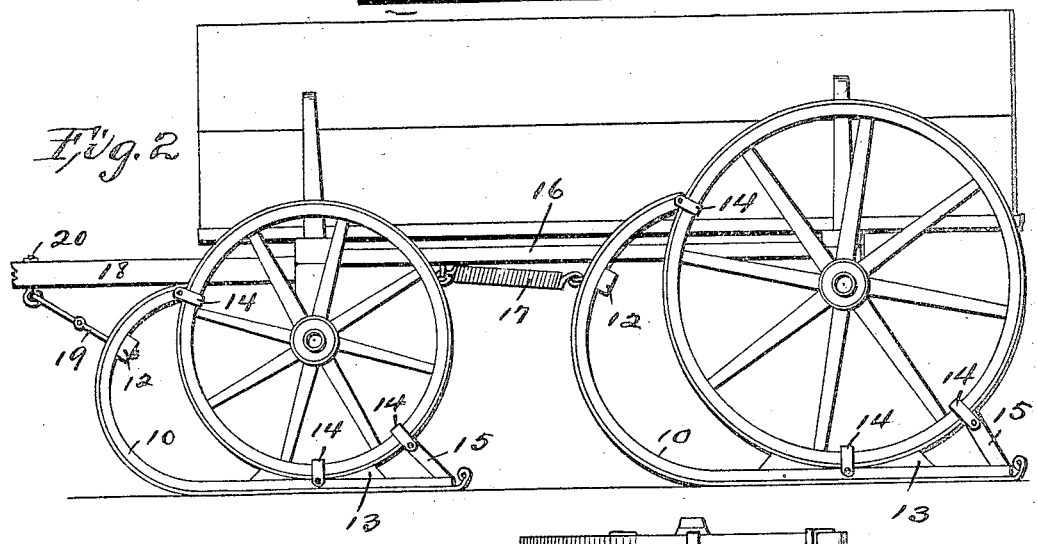
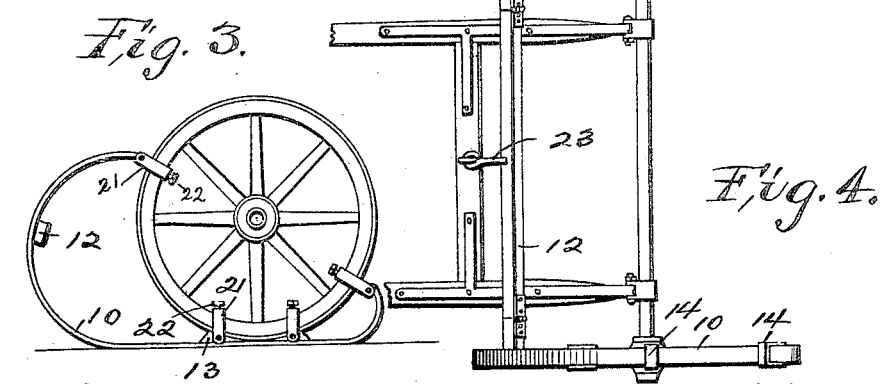

UNITED STATES PATENT OFFICE.

JOHN I. NICHOLSON AND THOMAS E. NICHOLSON, OF WASHINGTON, IOWA.

SLEIGH-RUNNER ATTACHMENT FOR VEHICLES.

No. 817,982. Specification of Letters Patent. Patented April 17, 1906.

Application filed July 8, 1905. Serial No. 269,115.

*To all whom it may concern:*

Be it known that we, JOHN I. NICHOLSON and THOMAS E. NICHOLSON, citizens of the United States, residing at Washington, in the county of Washington and State of Iowa, have invented a new and useful Sleigh-Runner Attachment for Carriages on Wheels, of which the following is a specification.

Our object is, first, to utilize the running-gear of a wheeled vehicle for producing a sleigh or sled advantageously; second, to provide runners in pairs adapted to be detachably fixed to the wheels of vehicles, as required to utilize the runners and the wheels jointly in combination with the reach and tongue of a two-horse wagon or carriage or shafts of a one-horse vehicle; third, to rigidly fix the runners to the wheels as required to prevent the wheels from rotating and flexibly connect them with the reach, box, pole, or shaft, as required to allow lateral and vertical motion between the parts relative to each other and the surface of the ground upon which the vehicle is advanced.

Our invention consists in the construction, arrangement, and combination of elements and subcombinations, as hereinafter set forth, pointed out in our claims, and illustrated in the accompanying drawings, in which—

Figure 1 is a top view of a pair of sleigh-runners rigidly connected at their front portions by a straight cross-bar. Fig. 2 is a side elevation of a two-horse wagon and shows pairs of runners combined therewith, as required for practical use. Fig. 3 shows a modified manner of detachably clamping a runner to a wheel. Fig. 4 shows the front of a one-horse vehicle in an inverted position and the runners flexibly connected with the shafts and also flexibly connected with each other by a jointed cross-bar.

The numeral 10 designates mating runners connected at their front portions, as shown in Fig. 1, by a cross-bar 12. To their central parts and on their tops are fixed blocks 13, that are concave on their top surfaces, as required to admit the convex surfaces of the rims of the wheels to which the runners are to be fitted and fixed by means of clips 14 and braces 15, as shown in Fig. 2, or in any suitable way.

The pair of runners 10, connected with the rear wagon-wheels, are flexibly connected with the wagon-reach 16 by means of a coil-spring 17, attached to the center of the cross-bar 12, as shown in Fig. 2, or in any suitable way that will allow restricted vertical and also lateral motion of the reach and wagon relative to the pairs of runners fixed to the wheels.

The pair of runners fixed to the front wagon-wheels are flexibly connected with the wagon-pole 18 by means of a jointed screw-bolt 19, fixed to the center of the cross-bar 12, and to an eyebolt 20, fixed to the pole, as shown in Fig. 2, or in any suitable way, as required to allow vertical and lateral motions relative to the runners 10 and cross-bar 12, fixed on the runners.

Fig. 3 shows clamps 21, pivotally and detachably connected with the runners 10 and the blocks 13 and set-screws 22 in the clamps to engage the inside surfaces of the rims of the wheel, as required to securely retain the runners detachably fixed to the wheel.

Fig. 4 shows the cross-bar 12, jointed near its ends, as required to allow independent vertical motion to the runners 10 and wheels to which they are fixed. It also shows the center of the cross-bar flexibly connected with the center of the cross-bar of the shafts by means of eyebolts 23, as required to allow vertical and lateral motions between the cross-bar 12 and the shafts.

Having thus set forth the purposes of our invention and its construction and application, the practical operation and utility thereof will be readily understood by farmers and others familiar with the art to which it pertains.

What we claim as new, and desire to secure by Letters Patent, is—

1. A pair of sleigh-runners connected at their front end portions by a cross-bar and detachably fixed to the rear wheels of a wagon and the cross-bar flexibly connected with the reach of the wagon by means of a spring.

2. A pair of sleigh-runners connected at their front end portions by a cross-bar and detachably fixed to the front wheels of a wagon and means to detachably and flexibly connect the cross-bar to the pole of the wagon.

3. A pair of sleigh-runners connected at their front end portions by a cross-bar and detachably fixed to the front wheels of a wagon and a jointed screw-bolt to detachably fix the cross-bar to the pole of the wagon.

4. A sleigh-runner attachment for carriages on wheels comprising a pair of runners rigidly connected by a cross-bar and the cross-bar flexibly connected with the carriage-pole and the runners detachably fixed to the front carriage-wheels and a second pair of runners rigidly connected by a cross-bar and the cross-bar connected with the reach of the carriage and the runners detachably fixed to the rear carriage-wheels.

JOHN I. NICHOLSON.
THOMAS E. NICHOLSON.

Witnesses:
SETH K. COATS,
J. G. KELLOGG.